No. 806,654. PATENTED DEC. 5, 1905.
L. S. FLATAU.
WHEEL TIRE.
APPLICATION FILED MAR. 11, 1905.

2 SHEETS—SHEET 1.

WITNESSES:

INVENTOR:
Louis S. Flatau.
BY
Attorneys.

No. 806,654. PATENTED DEC. 5, 1905.
L. S. FLATAU.
WHEEL TIRE.
APPLICATION FILED MAR. 11, 1905.

2 SHEETS—SHEET 2.

Witnesses
Inventor
Louis S. Flatau,
By Lars Brugger & Co.
Attorneys

UNITED STATES PATENT OFFICE.

LOUIS SPENCER FLATAU, OF ST. LOUIS, MISSOURI.

WHEEL-TIRE.

No. 806,654.     Specification of Letters Patent.     Patented Dec. 5, 1905.

Application filed March 11, 1905. Serial No. 249,542.

*To all whom it may concern:*

Be it known that I, LOUIS SPENCER FLATAU, a citizen of the United States, residing at St. Louis, State of Missouri, have invented new and useful Improvements in Wheel-Tires for Automobiles, &c., of which the following is a specification.

My invention relates to improvements in wheel-tires more especially designed for automobiles.

It has for its object, among other things, to promote great efficiency and durability and to provide for the desired cushioning qualities and adaptability for light automobiles, as well as to especially meet the demands or requirements of the heaviest type of this class of machines, which will all more fully appear, together with sundry other advantages, from the following disclosure of the invention.

The nature of said invention consists of various structural features, substantially as hereinafter described and shown and particularly pointed out by the claims.

Figure 1:
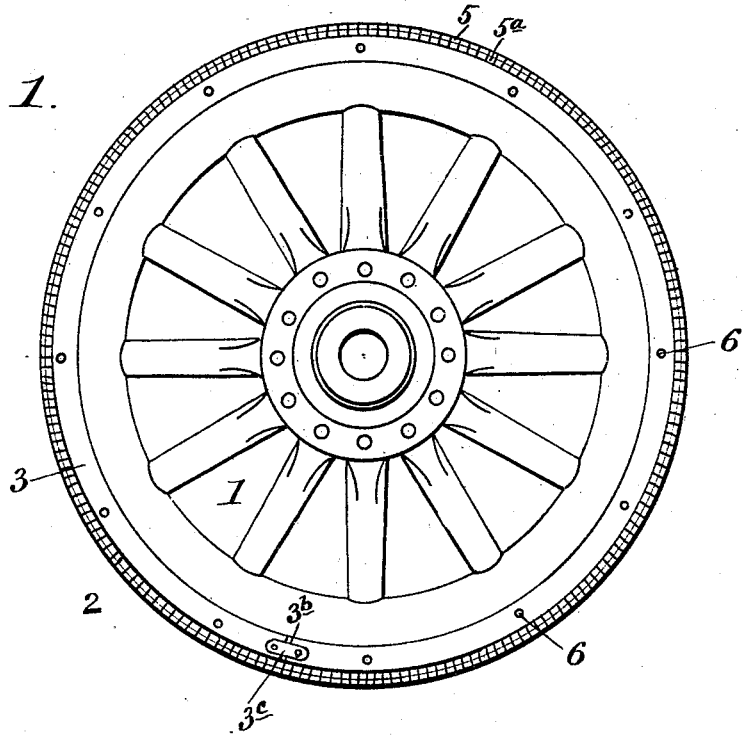
Figure 2:
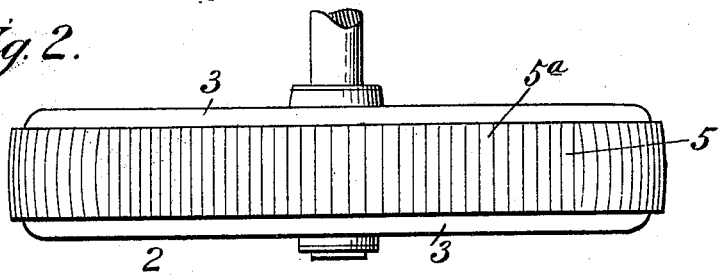
Figure 3:
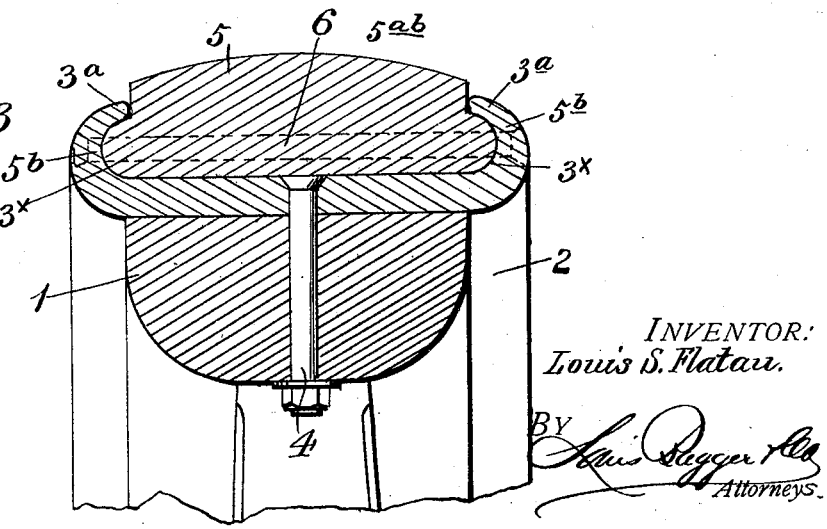
Figure 4:
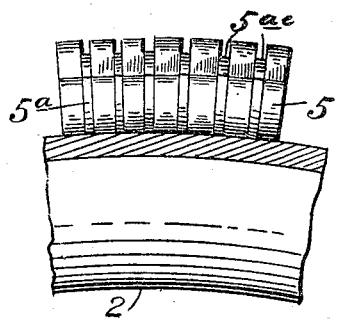
Figure 5:
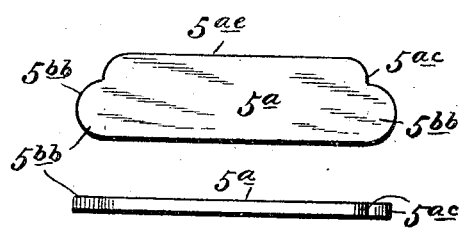
Figure 6:
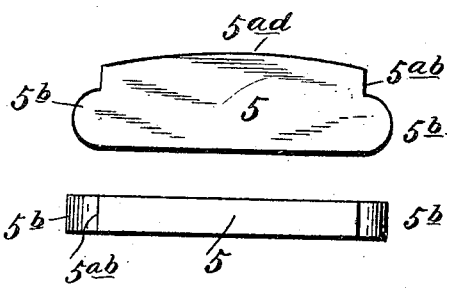

In the accompanying drawings, illustrating the preferred embodiment of my invention, Figure 1 is a side elevation of a wheel, preferably of the automobile type, built upon the principle of said invention. Fig. 2 is a plan thereof. Fig. 3 is a fractional enlarged vertical section, and Fig. 4 is a like side view with the near flange of the tire member cut away. Fig. 5 shows a side and a plan view of a steel-tire member or segment. Fig. 6 shows like views of a rubber or elastic tire member or segment.

In the carrying out of my invention I apply to the felly portion 1 of a wheel 2 of the type above noted a preferably malleable-iron tire member 3, shrunk in position thereon in the usual way, as well understood, the complete wheel thus far, however, only partially finished, being about thirty inches in diameter. Said tire member is also connected to said felly portion, preferably, by suitable bolts 4, passing through said tire member and through said felly portion intermediately of the wheel-spokes and secured in place by their nuts and heads, the latter being countersunk in the tire member. Said tire member has a practically dovetailed formation, as shown particularly by Fig. 3, forming an annular seat $3^x$ throughout said tire member, with preferably exteriorly-rounded and inward-clenched flanges, as at $3^a$, the purpose of which will be presently explained. Said tire member 3 has its annular dovetailed seat $3^x$ filled in or equipped with edgewise-disposed pieces or segments 5 $5^a$, of metal or steel and rubber or elastic material, respectively, alternating one another in arrangement in thus forming the periphery proper or tread of the wheel. The rubber sections or segments are each about half an inch thick and the steel segments or sections about three-sixteenths of an inch thick, and both rubber and steel segments or sections are practically of the outline disclosed especially by Figs. 5 and 6, each being rounded laterally, as at $5^b$ $5^{bb}$, respectively, upon its inner base portion to fit into and conform to the corresponding or concaved inner opposite surfaces of the tire member 3. The exposed surfaces of the lateral or end portions of said rubber and steel segments or sections are produced upon practically right lines, as at $5^{ab}$ $5^{ac}$, respectively, the surface, $5^{ac}$, however, being preferably slightly rounded at the corners. The tread-surfaces or edge portions of the rubber segments or sections are produced upon a curve convexing outward, as at $5^{ad}$, while the corresponding surfaces or edges of the steel segments or sections are produced upon practically right lines, as at $5^{ae}$. These steel and rubber segments or sections stand generally a certain distance beyond the outer edges of the tire member 3 to constitute the wheel-tread proper, while the steel segments are about a quarter of an inch shorter or of less depth than the rubber segments or sections, as seen particularly in Fig. 4, the purpose of which will presently appear.

In performing the work of filling in the steel and rubber segments, this being done alternately, they are initially inserted endwise and then "wrenched" around at right angles to the initial insertion to their normal position. At certain intervals in this operation, as in successively reaching points in radial alinement with each wheel-spoke, a cross pin or rivet 6 is inserted through opposite apertures made in the lateral flange portions at each of said points, this being effected to permit of accordingly holding the segments or work while shifting the clamp used in "wrenching" or jacking up the same, as in solidly forcing or compressing the segments one against the other. This operation is continued, of course, until the maximum number of segments have been placed in position upon the tire member to secure the proper density or compactness of wheel tire or tread. It is here observed that these rivets have the effect to also brace the side walls of the tire member 3, especially near their outer free edges, to aid in effectively preventing the spreading thereof. Laterally through one of the flanges or outstanding portions of the tire member 3 is a slot or opening 3ᵇ to provide for the placing of the final segment in position in said member, as in completing the filling operation, which slot is then suitably closed by what may be termed a "felly-clamp" 3ᶜ, riveted to the felly over said slot, rendering the same as effective or secure as any other part of the tire.

It will be noted that by reason of the rubber segments extending beyond the metal or steel segments they will become condensed to such an extent under a heavy weight or load as to permit the exposure of the metal or steel segments, as upon the principle of the projecting of an animal's claw, and by their greater impinging action prevent the slipping of the wheel, as would otherwise be liable to occur. Also it is observed that if the ground should be soft the rubber segments would become still more condensed or compressed by contact with the surface between the steel or metal segments, additionally exposing or projecting, as it were, said steel segments still further guarding against a slipping action. By reason of the individual rubber and steel segments being solid or compact and having a mutually binding or bracing action and seated into the tire member upon the dovetailed principle there is no liability of radial displacement of said segments nor bursting or collapsing of the tire, while the greater the amount of pressure or stress exerted thereon the tighter or more compact the parts become by compression, and in that particular especially are unlike any other tires heretofore in use.

Upon hard roads, rock, or asphaltum streets a wheel equipped with this tire rolls or travels like a solid tire of steel. The projecting rubber segments, receiving the shock, compress until the steel segments become flush with said rubber segments or cushions, thereby rendering the same both noiseless and springy. Further, this tire is characterized for durability or its lasting qualities for the reason that the rubber segments will never wear out until the steel or metal segments have become all worn out. Also the segments—rubber and steel—could wear down to the "round" or inner clenched edges of the tire member until the latter could not hold said segments any longer, and yet the tire would still retain its same general shape and perfection for practical purposes as when in its initial form or structure. This is apparent from the fact that with the wearing away of the steel segments beyond said tire member when that stage should have been reached the interposed rubber segments would continue to expand and project beyond the latter as at the outset or initial use, thus enabling the tire to retain its perfect cushioning qualities. Further, it is noted that the rubber and steel segments of this tire have an automatic and mutual cleaning action. For instance, in muddy or soft land the rubber segments would compress or sink deeper between the steel segments as the weight of the load was received upon the wheel. Consequently the instant the thus-compressed rubber segments were relieved of this condition they would expand or return to normal position and, as is apparent, carry with them and remove any adhering dirt upon the adjoining surfaces of the steel segments, and thus effect the cleaning thereof, while the steel segments or blades would, as the rubber segments were subsequently compressed, in like manner remove any adhering dirt from and clean the rubber segments.

Latitude is allowed as to details herein, since they may be changed as circumstances suggest without departing from the spirit of my invention.

I claim—

1. A wheel-tire of the character described, comprising a tire member, and alternating metal and elastic segments or sections forming the tread, the elastic segments normally projecting beyond said metal segments.

2. A wheel-tire of the character described, comprising a tire member having an annular dovetailed seat, alternating metal and elastic segments conformed at their base portions to said seat and forming the tread, the elastic segments normally projecting beyond said metal segments.

3. A wheel-tire of the character described, comprising a tire member having an annular seat and alternating metal and elastic segments arranged in said seat and forming the tread, the elastic segments normally projecting beyond said metal segments, said tire member having its outer free edges "clenched" inward, and said metal and elastic segments having their base portions extending in under said "clenched" edge portions.

In testimony whereof I affix my signature in presence of two subscribing witnesses.

LOUIS SPENCER FLATAU.

Witnesses:
C. A. COUR,
J. E. LEITH.